(12) United States Patent
Ilochonwu et al.

(10) Patent No.: US 11,223,513 B2
(45) Date of Patent: Jan. 11, 2022

(54) DIGITAL AVATAR AT AN EDGE OF A NETWORK

(71) Applicant: Schlumberger Technology Corporation, Sugar Land, TX (US)

(72) Inventors: Obinna Ilochonwu, Sugar Land, TX (US); Clare Schoene, Houston, TX (US); Lionel Beneteau, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/720,529

(22) Filed: Dec. 19, 2019

(65) Prior Publication Data

US 2021/0194750 A1     Jun. 24, 2021

(51) Int. Cl.
*H04L 12/24* (2006.01)
*H04L 29/08* (2006.01)
*G16Y 40/00* (2020.01)

(52) U.S. Cl.
CPC ............ *H04L 41/046* (2013.01); *G16Y 40/00* (2020.01); *H04L 41/145* (2013.01); *H04L 67/1097* (2013.01); *H04L 67/12* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 10,798,175 B1* | 10/2020 | Knight | H04L 67/16 |
| 2015/0169811 A1* | 6/2015 | Turnquist | G06F 30/23 |
| | | | 703/2 |
| 2017/0155710 A1 | 6/2017 | Quinn et al. | |
| 2018/0004868 A1* | 1/2018 | Adam | E21B 43/00 |
| 2018/0184232 A1* | 6/2018 | Maitra | H04W 4/70 |
| 2018/0300124 A1 | 10/2018 | Malladi et al. | |
| 2019/0090305 A1 | 3/2019 | Hunter et al. | |
| 2019/0123959 A1 | 4/2019 | Joshi et al. | |
| 2019/0138333 A1* | 5/2019 | Deutsch | G06F 30/20 |
| 2019/0220210 A1* | 7/2019 | Bernat | G06F 12/0292 |
| 2019/0260831 A1* | 8/2019 | Milev | H04L 67/125 |
| 2019/0340843 A1* | 11/2019 | McCarson | G06N 5/022 |
| 2020/0142365 A1* | 5/2020 | Sharma | G05B 15/02 |

OTHER PUBLICATIONS

International Search Report and Written Opinion issued in the PCT Application PCT/US2020/063438, dated Mar. 29, 2021 (9 pages).

* cited by examiner

*Primary Examiner* — Lance Leonard Barry
*Assistant Examiner* — Mohammad Yousuf A. Mian (57) ABSTRACT

Systems and methods may be used to implement twinned or linked digital avatars as an edge avatar and a cloud avatar for a particular physical device in an industrial site. The edge avatar is configured to ingest data generated in the industrial site and to use a model for the particular physical device to obtain device-specific parameters related to the particular physical device. The edge avatar also sends information related to the device-specific parameters to a cloud avatar that is linked to the edge avatar. The cloud avatar is implemented in a cloud network away from the industrial site. The edge avatar is also configured to receive updates from the cloud avatar for the edge avatar and to refine the edge avatar using the updates.

21 Claims, 8 Drawing Sheets

DIGITAL AVATAR AT AN EDGE OF A NETWORK

BACKGROUND

This disclosure relates to a digital avatar at an edge of a network that provides a digital representation of a physical device, process, or service, in combined use with cloud-based digital avatar.

The Industrial Internet of Thing (IIoT) has become pervasive in many industries, particularly in large facilities, such as those used in equipment manufacturing and energy production where large numbers of devices and processes are frequently utilized. By forming digital replicas, representing physical devices and/or processes in a virtual environment (e.g. a cloud) and communicatively linking digital replicas to respective devices or processes, a central network based (or cloud-based) intelligent management system may be used to monitor, track, and/or interact with physical devices and processes to improve automation, efficiency and/or data available for better decision making.

With the growth of IIoT devices and the associated large amounts of data generated, the central-network-based intelligent management system may be inhibited by network latency and/or limited communication bandwidth. For real-time applications that use time-sensitive information, long travel paths between field sites may inhibit functioning of the central-network-based intelligent management system due to latency and/or limited available bandwidth.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and operation-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As used herein, a digital avatar is a collection of models and data that create a unique "evergreen" representation of a physical asset or process. The digital avatar can exists throughout the life cycle of the asset or process from birth to obsolescence. The digital avatar provides a bridge between the physical and digital world. For example, users may operate, maintain, or repair field equipment without being in physical proximity to a remote location where the field equipment corresponding to a digital avatar is deployed. Additionally or alternatively, analytics and predictions learned in the virtual environment may be applied to the physical world. The digital avatar enables users to simulate and/or test physical devices, processes, or services in a virtual environment by using models tied to the physical devices, processes, or services. For example, the digital avatar may use model simulation based on field equipment specifications and jobsite environmental factors to predict an expected lifetime, thereby enabling users to order replacement equipment ahead of time to prevent operational gap. The pairing of the virtual and physical worlds enables real-time system monitoring and data analysis to predict potential problems, prevent downtime, and/or develop an optimized plan by using advanced data processing and simulations.

The digital avatar has become cost-effective to implement as the rapid growth of the Industrial Internet of Things (IIoT) continues. The IIoT is a system of interrelated computing devices, digital sensing devices, intelligent equipment, or any type of smart objects that have the ability to transfer data over a network without human-to-human or human-to-computer interaction. Based on the enhancements available using the IIoT, IIoT devices are increasingly becoming ubiquitous and accessible. By creating a digital model for an IIoT device and forming a digital representation based on the digital model, the digital avatar may be built and integrated into a network (e.g., a cloud) that is communicatively linked to the IIoT where the IIoT device is deployed. For every IIoT device, there may be a virtual copy (i.e., digital avatar) running in the cloud that may be updated with streaming data derived from operations. With a greater flow of information and incorporated data processing and/or simulation capabilities, the IIoT embedded with the digital avatar may be used to provide users with the ability to track, monitor, and lighten workloads with automation and improved efficiency and better decision making. The digital avatar may cover the entire lifecycle of the product, process, or service and form the foundation for remotely operating, maintaining, or troubleshooting the connected product, process, or service.

As a large number of IIoT devices generate and transmit enormous amounts of data during operations, managing remotely deployed IIoT devices from a cloud-based digital avatar may face challenges. For example, some operations may rely on fast response time based on real-time data processing. However, network latency and/or communication bandwidth issues between the cloud and the IIoT devices may inhibit the time-sensitive operations.

Edge computing may help solve the problems caused by network latency and/or communication bandwidth. Edge computing is a part of a distributed computing topology in which a part of information processing is located close to the edge of a network rather than solely through a remote cloud connections. In other words, edge computing brings computation and data storage closer to the devices where the data is gathered, rather than relying on a central location that may be thousands of miles away. By pushing a digital avatar to the edge of the network, the data generated by IIoT devices (referred as IIoT data), especially real-time data, may not suffer from latency and/or bandwidth issues that can inhibit operational performance. A digital avatar at edge, for example, may process IIoT data locally and send instructions back to corresponding IIoT device for real-time application needs without the IIoT data leaving a network at site where the IIoT data originated. The digital avatar may then send only a portion of the IIoT data and pre-processed data to the cloud, thereby reducing bandwidth consumption.

As previously discussed, a digital avatar is a digital representation (or digital avatar) of an asset. The asset may be a physical device, process, or service. The physical device may be a physical object such as a sensor, a tool, an equipment, or a machine. The process may be a procedure involved in mechanical, physical, electrical or chemical steps in manufacturing or other industrial operations. The digital avatar may include a dynamic model (evergreen model) specifically linked to the asset and changes with the asset. The digital avatar provides an abstraction layer for applications and users to access asset data and to monitor and control the asset. In addition, by communicatively linking multiple digital avatars that represent similar assets, value-added data and/or learning result may be shared to improve the operational performance and reduce errors.

Figure 1:
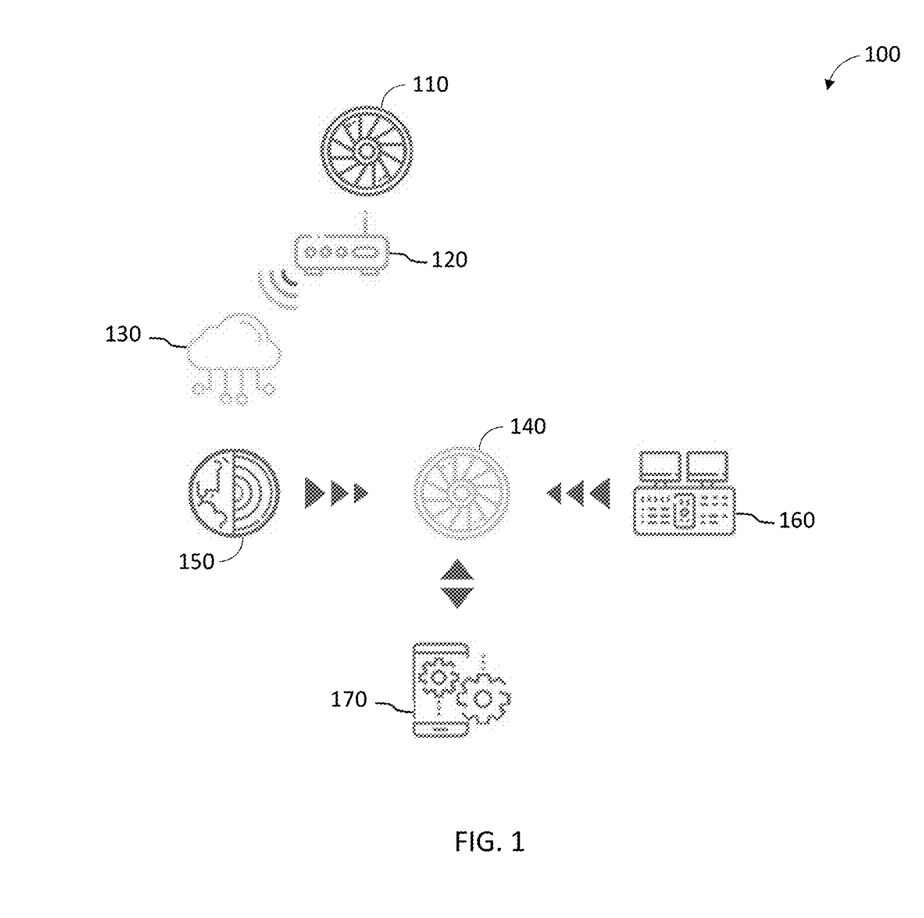
FIG. 1 depicts a schematic diagram of a digital avatar system, in accordance with an embodiment.

With the preceding in mind, turning now to the figures, FIG. 1 depicts a schematic diagram of a digital avatar system 100. A digital avatar 140 may be assigned to each item 110 functioning as its digital representation. The digital avatar 140 may include a dynamic model specifically linked to the item 110. The digital avatar 140 provides an abstraction layer for applications and users to access operational and/or device data to monitor and/or control the item 110. The items 110 may include a physical device, a process, or a service. The data acquired by the item 110 (e.g., acquired by the physical device or generated from the process or service) may be uploaded to a cloud 130 via an industrial internet of thing (IIoT) platform 120 that provides support for the item 110. The uploaded data may be categorized, tagged, and stored into an IIoT database 150. In some embodiments, the data may be pre-processed before being stored to the IIoT database 150. For example, directly measured measurements using the item 110 may be used to calculate and/or estimate secondary measurements derivable from the directly measured measurements. Additionally or alternatively, the data may be filtered and/or sorted before storage. The digital avatar 140 may access the data stored in the IIoT database 150, use at least a portion of the data as an input to feed into a model selected from a group of integrated system models 160, and run at least one simulation after receipt of the input from the IIoT database 150 by using the algorithms of the selected model to obtain the modeled output data. Such modeled data may be used for optimizing parameter(s) and/or operation(s) of the item 110.

In addition, the digital avatar 140 may be communicatively linked to business applications 170, such as operational systems. The digital avatar 140 may receive updated data generated from the business applications 170. For instance, the business applications 170 may include a manufacturing management system, and the digital avatar 140 may access initial information about the item 110 at a time of manufacture. For example, the initial information may include material properties, defects, serial number, and the like existing at time of manufacture for a physical device. In one or more embodiments, as the item 110 is deployed, the digital avatar 140 may obtain access to additional information from a management system assigned to the item 110. For example, the additional information may arise from inspection or subsequent testing of a physical device some period of usage after manufacture.

Figure 2:
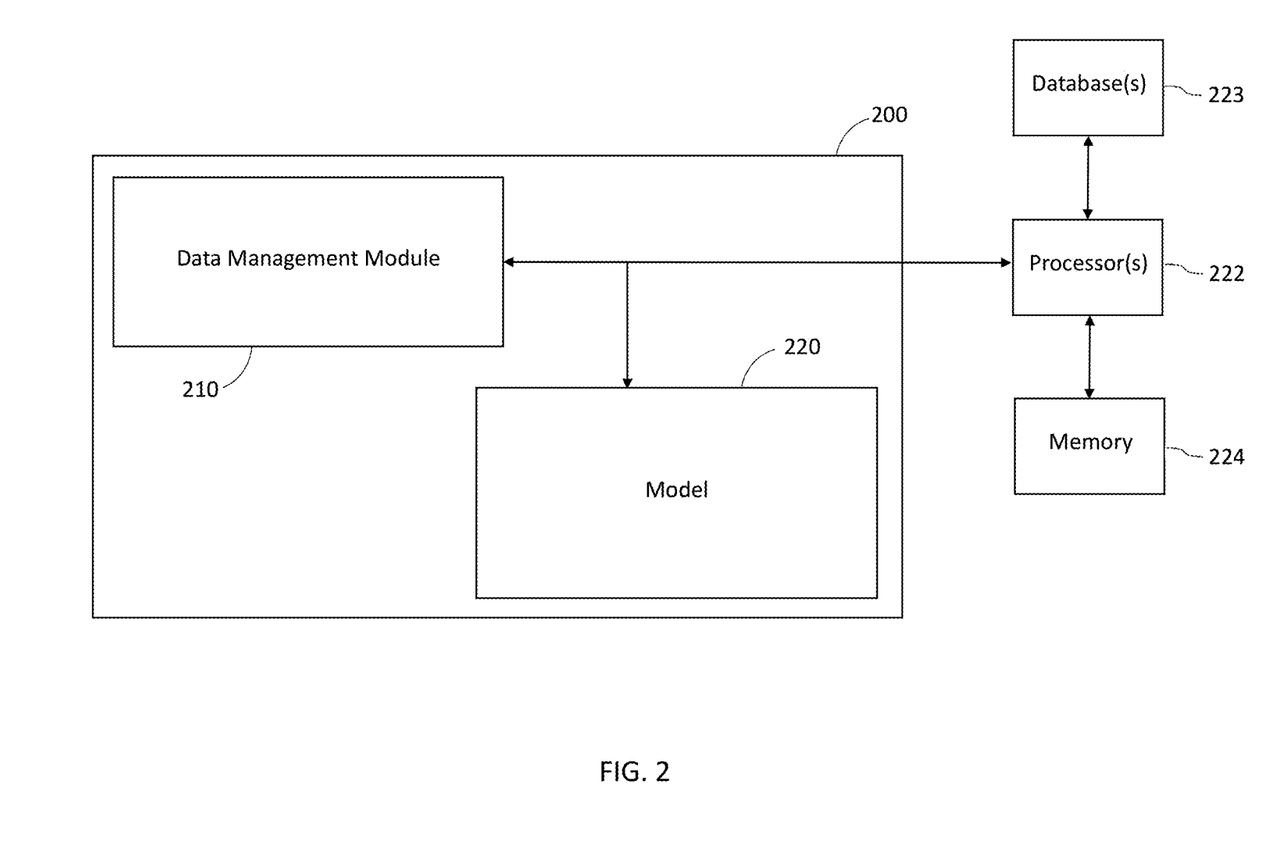
FIG. 2 depicts a block diagram of a model management system that may be used in the digital avatar system of FIG. 1, in accordance with an embodiment.

FIG. 2 depicts a block diagram of a model management system 200 that may be used in the digital avatar system of FIG. 1. In this example embodiment, the model management system 200 includes a data management module 210 and one or more models 220 (e.g., the integrated system models 160). When more than one model 220 is used, at least some outputs from one model 220 may be input into a next model 220 of the models.

The data management module 210 may include communication protocols and processing instructions. The data management module 210 may be in communication with one or more processors referred to as a model management processor 222 hereinafter. The model management processor 222 may include one or more distributed processors, cloud-based processors, local processors, or combinations thereof.

The communication protocols included in the data management module 210 enable the model management system 200 to communicate with one or more databases 223. For example, the protocols may include Open Database Connectivity (ODBC), TCP/IP Protocol, Distributed Relational Database Architecture (DRDA) protocol, Database Change Protocol (DCP), HTTP protocol, other suitable protocols, or combinations thereof.

The model management processor 222 may execute the processing instructions stored in a memory 224. The processing instructions may instruct the model management processor 222 to retrieve information from the one or more databases 223 using the protocols. Additionally or alternatively, the processing instructions may instruct the model management processor 222 to process the data from the one or more databases 223 and route appropriate data to one or more models 220 as an input.

The model management processor 222 may also be configured to receive outputs from the model 220. The model management processor 222 may provide data tagging to the outputs. The data tags may be used as identifications by one or more processors (e.g., the model management processor 222 and/or other connected processor(s)), to cause the data to be stored to an appropriate location in the one or more databases 223.

The more processing instructions may be stored in a non-transitory, computer-readable medium (e.g., memory 224) with the processing instructions, when executed by the model management processor 222, causing the model management processor 222 to detect when a new input is provided to a linked database (e.g., database(s) 223). The instructions may cause the model management processor 222 to process and map the data from the database to an appropriate input for the model 220. The instructions, when executed, also cause the model management processor 222 to cause the model 220 to run the simulation after receipt of the new input from the database 223; and process the output from the model 220 to configure the output to be mapped to an appropriate location in the database 223.

In one or more embodiments, the model management processor 222 may be configured to send data to the database 223 and store the modeled data in the appropriate location in the database 223. In another embodiment, the model management processor 222 may send the processed data to a connected system, and an additional processor may use the previously discussed data tags associated with the processed data to locate the appropriate database 223 and input the data into the appropriate location.

The data management module 210 may detect new inputs entering into a linked database by receiving a signal sent by a processor in communication with the database 223 indicating that new data has been received, a signal sent by the model management processor 222 in communication with the database 223, or combinations thereof. In one or more embodiments, the signal may be sent by a user who inputs the data by clicking a save button on a user interface that sends a signal to the model management processor 222 or another processor in communication with the database 223.

The signal may also be sent when a processor in communication with the database 223 detects that new data has been received. The processor in communication with the database 223 may compare a historical database to an active database at a predetermined interval (e.g., 1 millisecond, 1 second, 1 minute, or 1 hour). The predetermined interval may be any suitable interval of time. In other embodiments, one or more processors in communication with the database 223 may be configured to compare a prior historical database (i.e., a copy of the database last updated at the end of the preceding interval) at a time lapse from the end of the last update (e.g., 10 seconds) to an active database. If the processor determines that there is now additional data in the active database, the processor may send a signal to the data management module 210, and the data management module 210 may then instruct the processor linked to the model management system 200 to retrieve the newly inputted data from the active database.

In one or more embodiments, the data management processor 222 may be instructed to take actions under computer instructions in the data management module 210. For instance, the data management processor 222 may compare the historical database to the active database at a predetermined interval in addition to or alternative to the comparison by the processor in communication with the database 223. For example, the model management processor 222 may be configured to compare a prior historical database (i.e., a copy of the database last updated at the end of the preceding interval) at a time lapse from the end of the last update (e.g., 2 seconds) to an active database. If the model management processor 222 determines that there is now additional data in the active database, the data management processor 222 may retrieve the new input from the database 223.

The newly inputted data may be received by the data management module 210. A set of processing instructions may instruct the model management processor 222 to process and map the data from the database 223 to an appropriate input for the model 220. For example, the processing instructions may instruct the model management processor 222 to identify the data tag or tags associated with a specific field asset or to identify a data tag or tags associated with a specific field data type (such as temperature-, pressure-, and geometry-measuring tools). Once the data is identified, the data management module 210 may provide the data as an appropriate input to the model 220.

The model management processor 122 may be configured to provide at least a portion of the new input data to the model 220 and to run at least one simulation after receipt of new input from the database 223 by using the algorithms of the model 220. In one or more embodiments, the calculations on the inputs may be performed to create a modified input. The model 220 may use the identified new data associated with the appropriate input and/or the modified input to generate an output. The output may be tied to a specific data type (e.g., maximum job duration, etc.). The data management module 210 may then instruct the model management processor 222 to tag the data with appropriate identifiers that the database 223 can use to determine the appropriate location to store the output, and/or also associate the data with at least one input. For example, the output of the model 220 may be a maximum operating temperature for a pulse neutron generator (PNG), and the model management processor 222 may tag the data accordingly so that the data is placed in the appropriate location in the database 223. Furthermore, the model management processor 222 may identify a location for the output of the model 220 and store the output of the model 220 in the location, thereby updating a parameter for the item 110 to a new value (e.g., maximum operating temperature value). This parameter may then be made available to an inventory management module, a job planning module, other linked module(s), or combinations thereof. In one or more embodiments, the method may include running one or more models multiple times and receiving multiple results. The multiple results may be combined to provide a final input for one or more models.

Figure 3:
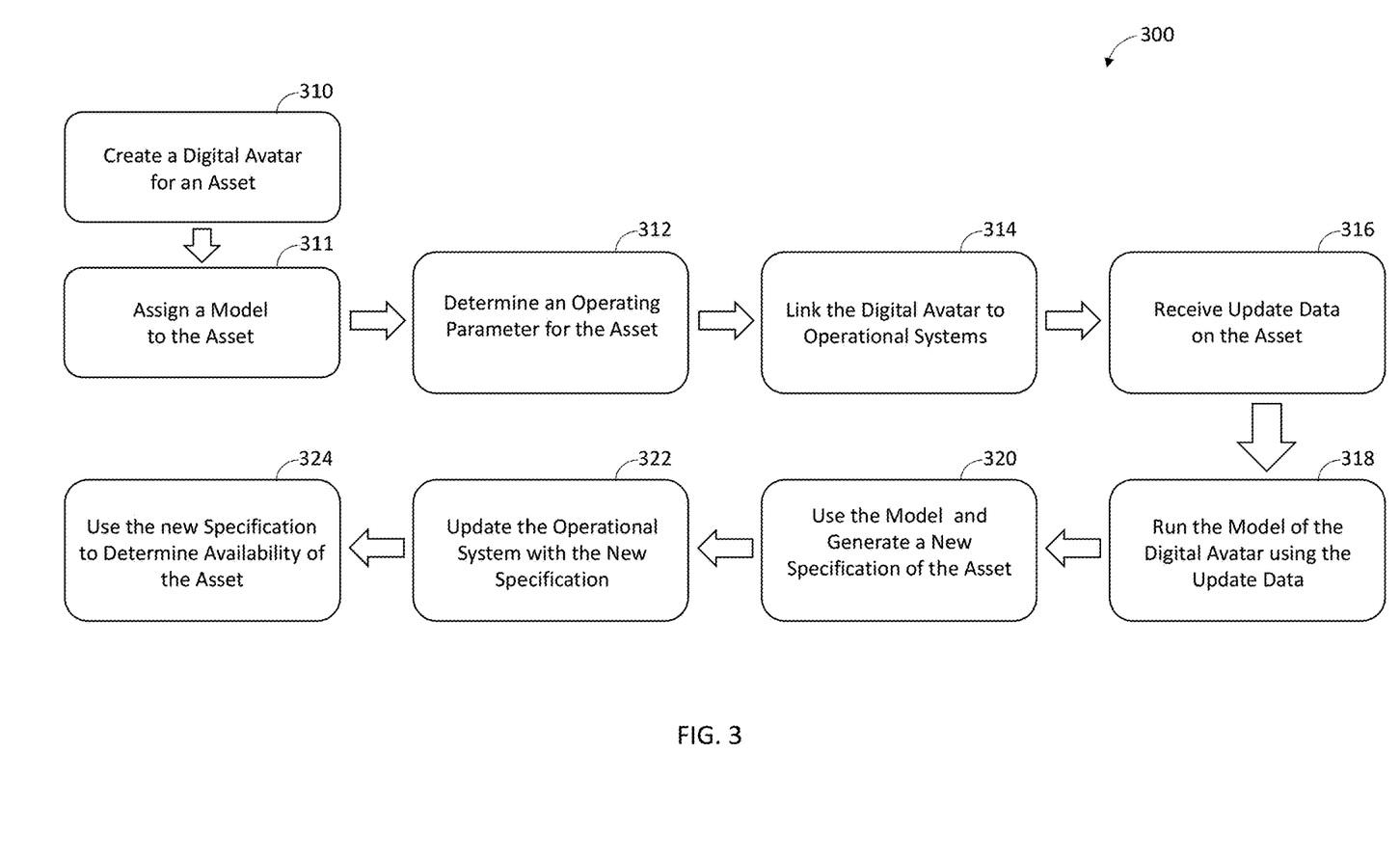
FIG. 3 depicts a flow diagram of an edge device management method that may be used by the digital avatar system of FIG. 1, in accordance with an embodiment.

FIG. 3 shows a flow diagram that illustrates asset management method 300 based on digital avatar. The asset management method 300 includes creating a digital avatar 140 for a field asset (block 310). The field asset may be similar to or equivalent to the previously discussed item 110 when the item 110 is a physical item, but when the item 110 is a process, the field asset may be the physical item used in the process. The digital avatar 140 may be created during the manufacture of the asset or may be created before manufacture with a later assignment. Creating the digital avatar 140 may include customizing a digital avatar template to correspond to a particular asset. The customization may include using manufacturing information that includes unique geometry, an asset identification code, and measured material properties of the asset to customize a simulation model; thereby, forming a unique digital avatar for the asset. Since the digital avatar is based on a particular asset, the digital avatars for different objects may differ even when the devices are substantially similar (e.g., have a same part number).

Regardless of creation date, the digital avatar 140 assigns the simulation model to the item 110 (block 311). In one or more embodiments, the digital avatar 140 may include a database that has the initial records of the item 110 and will be used to store all data entered on the item 110 during the lifecycle of the item 110. The initial records may include material properties, geometry, important check points, and original parameter (e.g., temperature) testing from the manufacturing center, and the like at time of manufacture of the item 110. The database included by the digital avatar 140 may enable the item 110 to be tracked with time to determine expected life for asset planning purposes (e.g., ordering new asset or scheduling maintenance actions).

The simulation model may be tailored to unique aspects of the item 110, such as the material properties, the geometry of the physical asset, the modes of failure, the temperature profile, the pressure profile, and the like. The simulation model may be configured to provide an output related to an operating threshold of the asset. For example, if the item 110 has a mode of failure due to a particular parameter (e.g., temperature, pressure, etc.), the simulation model may be used to predict at what threshold for the parameter the item 110, with the specific material properties and specific geometry will fail. Some value below that threshold (e.g., maximum operating temperature) may be used.

The asset management method 300 may also include determining an operating parameter for the asset (block 312). For example, the operating parameter may be determined from the model. The model may be fine-tuned by training and tuning the model to find the operating parameter at the calculated rating. Also, calculations outside of the model may be used to adjust the operating parameter. For example, calculations may be performed to determine the temperature rating for two failure modes (such as inhibited function or performance due to overheating and failure due to overheating). In addition, safety factors may be used to set an operating parameter rating, such as a temperature rating. Other operating parameter ratings may include heat generation, thermal conduction, heat dissipation, max load, max tension, other operating parameters, or combinations thereof.

The asset management method 300 may further include linking the digital avatar 140 to operational systems (block 314). The operational systems may include manufacturing management systems, work order management systems, field asset management systems, job planning systems, and the like or combinations thereof.

The digital avatar 140 may receive updated data generated from the operational systems (block 316). For example, the digital avatar 140 may obtain initial information (e.g., material properties, defects, serial number, and the like) for the item 110 from the linked manufacturing management systems. Furthermore, as the item 110 is deployed, the avatar may obtain additional information from a field asset management system as maintenance is performed on the item 110 or in a work order management system.

The linking of the digital avatar 140 to operational systems and updating the digital avatar 140 may be performed using at least one processor as new information on the associated asset is entered into the operational systems. For example, the new information may be acquired by running the model with the new output, using the at least one processor in communication with the digital avatar 140 and simulation model, to generate a new output; and providing the new output to at least one of the operational systems, using the at least one processor.

The at least one processor may include multiple distributed processors, cloud-based processors, local processors, or combinations thereof. In one or more embodiments, different numbers of the processors may be configured to perform the asset management. For example, a first processor of the processors may update the digital avatar 140 as new information on the associated asset is entered into at least one of the operational systems; a second processor of the processors in communication with the digital avatar 140 and simulation model may run the model with the new information to generate a new output; and a third processor of the processors may provide the new output to at least one of the operational systems.

The asset management method 300 may also include running the model of the digital avatar 140 using at least a portion of the updated data (block 318). For example, the updated data may include seal replacement information, surface finish information, outer diameter along one or more points of a tool, component switch out, other changes to the field asset, or the like. The model may use only the portion of the updated data that relate to parameters of interest (e.g., temperature, pressure, etc.). In other situations, the model may use all updated data as input data or may use multiple types of updated data or combinations of updated data as input data, such as surface information and outside diameter information.

Furthermore, the asset management method 300 may include using the model to generate a new specification of the asset (block 320), updating one or more operational systems with the new specification (block 322), and using the new specification to determine availability of the item 110 for a job with specific operating conditions (block 324).

Figure 4:
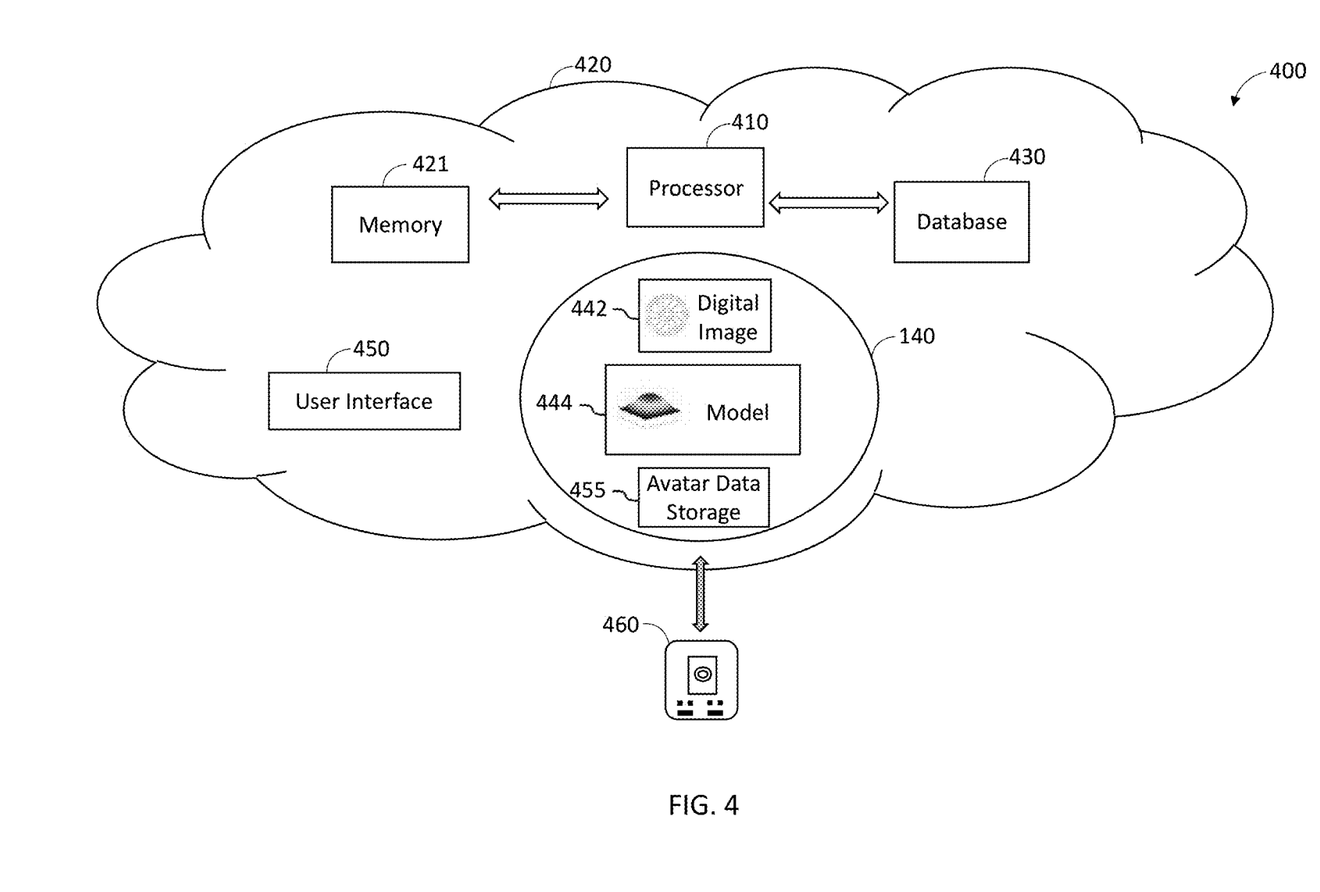
FIG. 4 depicts a schematic diagram of a cloud-based asset management system, in accordance with an embodiment.

FIG. 4 depicts a schematic diagram of a cloud-based asset management system 400 that includes a digital avatar of a field asset tied to a specific model. The field asset may be physical device, process, or service that is deployed or executed far away from a central asset management network used to implement a cloud. The cloud-based asset management system 400 may at least partially implement the asset management method 300 described in FIG. 3. For example, in a remote oil field, field assets (such as drilling tools, logging equipment, or pumping machines) may be deployed in remote locations. The cloud-based asset management system 400 enables creating, testing, and updating the digital avatar 140 assigned to the field asset in a virtual environment (e.g., a cloud) thereby enabling asset operators to initiate, operate, test, and control maintenance of the field asset without being physically in proximity to the field asset. The digital avatar 140 is a digital avatar of the field asset in the cloud.

The cloud-based asset management system 400 may include one or more processors 410 located within a cloud 420, one or more user interfaces 450, and/or devices, one or more digital avatars 140 stored in the cloud 420. The cloud 420 may also include a memory 421 used to store computer instructions to control operation of the one or more processors 410. The cloud 420 may also include one or more databases 430 located in the cloud 420. In some embodiments, the one or more databases 430 may be stored in the memory 421.

The digital avatar 140 may include a digital image 442 of a field asset 460, one or more simulation models 444, and a digital avatar data storage unit 455. In practice, the digital avatar 140 acts as a digital representation (replica) of the corresponding field asset 460 that is customized to a specific field asset. For instance, even two field assets that have a common part number and manufactured at the same time may have different digital avatars 140 that track the usage and particulars of the individual field assets. For example, a thermal digital avatar may represent at least the thermal aspects (such as operating temperature, heat generation, etc.) of a downhole tool assembly differently than a similar downhole tool assembly.

As previously noted, the computer instructions may be used to configure the processor 410. The processor 410 identifies when new data is inputted into the database 430. For example, when a user uploads data into the database 430 via user interface 450, the processor 410 may be configured to detect the upload to the cloud and may be configured to place the input data into the database 430 and provide the input data to the appropriate avatar that is tied to the field asset 460 associated with the input data. The processor 410 may be further configured to process the data using metadata, data tags, other identifiers, or combinations thereof to determine the asset associated with the input data and the type of parameters to which the input data applies. Accordingly, the cloud-based asset management system 400 may be able to store the data in the appropriate location in the database 430 and provide correct inputs to the simulation model 444. The processor 410 may also be configured to execute the algorithms of the simulation model 444 and obtain an output. The cloud-based asset management system 400 may store asset-specific information in the digital avatar data storage unit 455 in the appropriate location thereby updating the digital avatar 140. The output from the simulation model 444 may be stored into the database 430 as a new specification for the field asset 460. The database 430 may then be used to update asset availability. For example, when a field person is to use a similar asset and queries the database 430, the processor 410 may provide the new operating parameter for the asset and an indication of whether the asset can be used on the planned job based on the job parameters and the specifications of the asset.

The simulation model 444 may be selected from a group of integrated system models 160 stored in the cloud 420. By converting the simulation model 444 into an evergreen model that is configured to accurately and timely capture the changes occurred around the field asset 460, the prediction from model simulations may then be used to make decisions to ensure that the field operations are performed correctly and/or in an optimized manner based on timely data.

Figure 5:
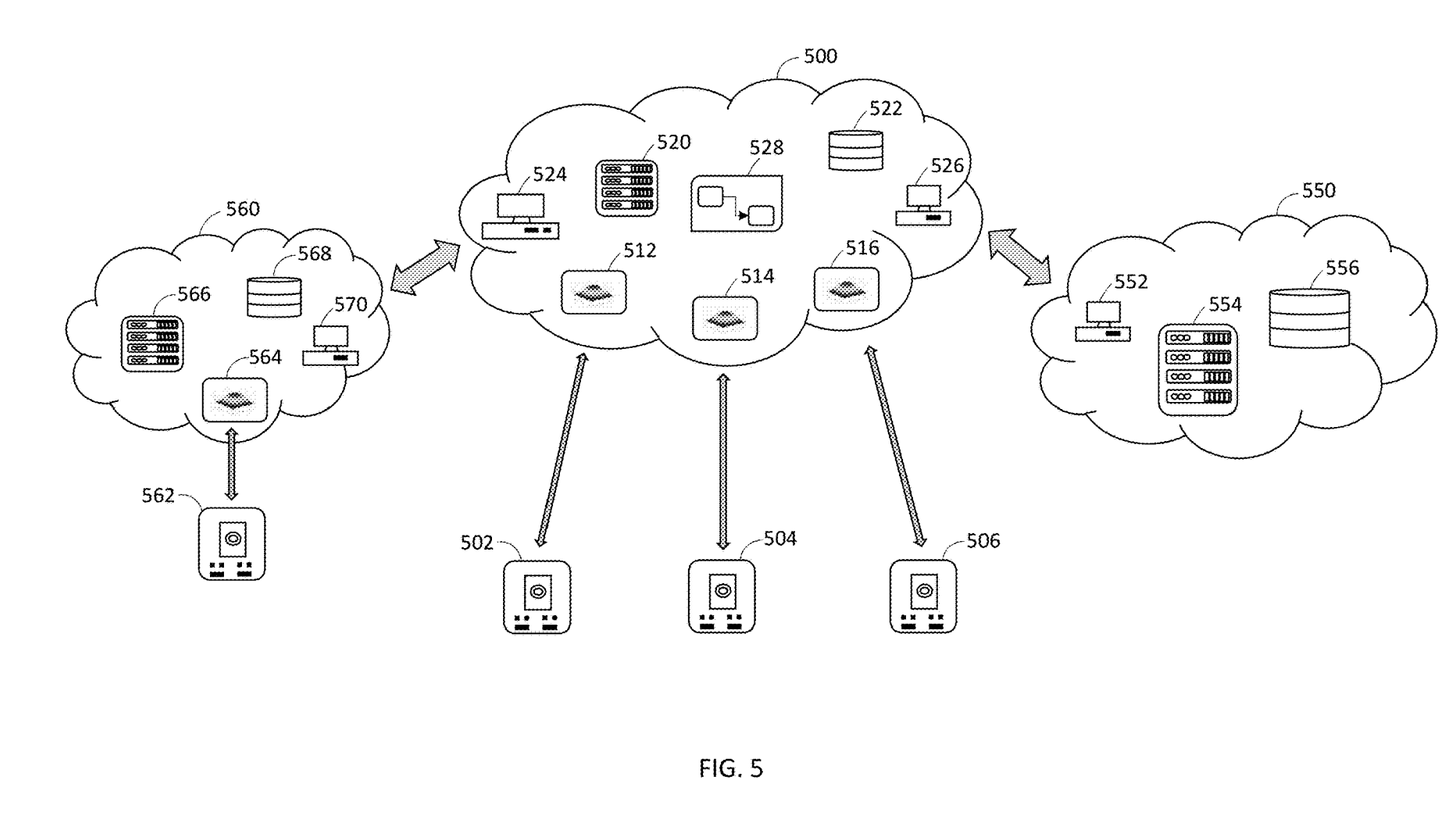
FIG. 5 depicts a schematic diagram of cloud avatar platform implementation, in accordance with an embodiment.

The cloud-based asset management system 400 described may be further extended into more complex implementations. FIG. 5 depicts a schematic diagram of a cloud avatar implementation using a cloud 500 where multiple field assets 502, 504, and 506 are remotely managed. The remote management is performed using cloud avatars 512, 514, and 516 in the cloud 500. The cloud 500 may be a private cloud that is an enterprise cloud owned by an organization. The cloud 500 may interact with another cloud 560. The cloud 560 may be a private cloud owned by the same organization, a private cloud owned by a different organization, or a public cloud. The cloud 560 may interface with other cloud networks (e.g., a public cloud 550).

Each of these clouds 500, 550, and 560 includes respective cloud servers 520, 554, and 566 and respective cloud storages 522, 556, and 568 that provide cloud avatar management, long-term historical data storage, hosting other operational systems, and the like. Although the cloud storages 522, 556, and 568 are illustrated as databases, the cloud storages 522, 556, and 568 may be implemented using any suitable number and type of storage types. In addition, the clouds 500, 550, and 560 include user interfaces 524, 526, 552, and 570. The user interfaces 524, 526, 552, and 570 may be configured to provide access from one cloud to another cloud. The user interfaces may be accessed via physical or virtual devices using any variety of data communication protocols and levels of data security implemented. For example, a field asset operator may use a mobile device with secured connectivity (e.g., local connection or via a virtual private network (VPN)) to gain access to the cloud avatar 512 through the cloud 500, 550, or 560. Based on the method of connection, the cloud-based asset management system 400 may limit access to some basic functions of the cloud avatar 512, such as monitoring the operational status of the corresponding filed asset 502.

In addition to the cloud avatars 512, 514, and 516, the cloud 500 may include operational systems 528. The operational systems 528 is similar to the operational systems described in block 314 of FIG. 3. The operational systems 528 may include manufacturing management systems, work order management systems, field asset management systems, job planning systems, other business system that may be used to manage field assets, manufacturing data, business data, the like, or combinations thereof. For example, the operational systems 528 may include a manufacturing management system so that the cloud avatars 512, 514, and 516 may access the initial information of the corresponding field assets 502, 504, and 506. For example, the initial information may include material properties, defects, serial number, and the like existing at time of manufacture for the respective field assets 502, 504, and 506. In one or more embodiments, as the field assets 502, 504, and 506 are deployed, the cloud avatars 512, 514, and 516 may obtain access to additional information from a field asset management system managing the field assets 502, 504, and 506 after some period after manufacture of the field assets 502, 504, and 506. The cloud-based asset management system 400 may use the additional information to run new simulations to generate new predictions for future field operations involving at least some of the field assets 502, 504, and 506 and may update the cloud avatars 512, 514, and 516.

In one or more embodiments, the cloud avatars 512, 514, and 516 may be communicatively linked to each other. The simulation models of the cloud avatars 512, 514, and 516 may use input data associated with other assets to identify a system operation parameter. For example, new data associated with a first component asset (e.g., the field asset 502) may correspond to a first digital avatar (e.g., the cloud avatar 512) and at least one associated first simulation model. New data associated with an input of the at least one first simulation models may be provided to the at least one first simulation model. A new output from the at least one first simulation model may indicate one operating parameter, such as maximum heat generation or maximum operating temperature/pressure, for the first component asset. Similarly, a second component asset (e.g., the field asset 506) may correspond to a second digital avatar (e.g., the cloud avatar 516) and at least one second simulation model. New data associated with an input of the at least one second simulation model may be provided to the at least one second simulation model. A new output from the at least one second simulation model may indicate one operating parameter, such as maximum ambient temperature, downhole pressure/temperature, or maximum operating temperature, for the second component asset.

Next, one or more processors (e.g., a processor for the cloud 500) may be configured to compare the operating parameters for each component asset, when related to similar parameters (e.g., maximum operating temperature) and select a particular field asset (e.g., field asset 502). For example, the field asset 502 may be used when its cloud avatar 512 has a lowest or highest parameter as a system operating parameter between the field assets 502, 504, and 506. For example, the first component asset may be more susceptible to heat impeding operation. The new operation parameter for the first component asset, which in this case may be the maximum operating temperature, may be less than the new operation parameter for the second component asset. In such case, the processor would select the maximum operating temperature of the first component asset as the maximum operating temperature for the asset. In another embodiment, if the new operating parameter is permissible heat absorption, the processor may select the lowest permissible heat absorption as the operating parameter. In essence, the more-limiting parameter may be selected depending on which operating parameters of the digital avatars would most significantly limit the operational scope of the complete system. Additionally or alternatively, the most restrictive parameter may be selected if the parameter is still within the bounds of a planned deployment.

As previously noted, the cloud 500 may be communicatively linked to the cloud 560, which includes one or more cloud avatars 564 to support one or more field assets 562. In one or more embodiments, an integrated asset management system crossing an organizational network including the clouds 500 and 560 may be used to perform operational planning for a fleet of assets, such as field assets 502, 504, 506, and 562. Through the linked cloud avatars 512, 514, 516, and 564 distributed among the clouds 500 and 560, the integrated asset management system may continuously receive updated operating parameters for each asset, and may compare the updated operating parameters to job requirements in multiple geographical locations, and may adjust deployments of the assets to the geographical locations that will maximize each assets ability to be used in its geographical location. For example, a first location (e.g., North America) that is tied to the cloud 500 may have job specifications that only use tools with temperature ratings of a first temperature (e.g., 150° C.), and a second location (e.g., Asia) that is tied to the separate cloud 560 may have job specifications that use tools with no less than a second temperature (e.g., 260° C.). Accordingly field assets (e.g., 502, 504, and 506) with operating parameters below the first temperature will be shipped to the first location, and field assets (e.g., 562) with operating parameters above the first temperature but below the second temperature will be shipped to the second location.

With fast growing applications of Industrial Internet of Things (IIoT) devices, a vast amount of data may be generated during continuous field operations. The data generated by IIoT devices (e.g., the field assets 502, 504, and 506) may be relayed back to central network servers (such as the cloud servers 520), which may be hosted in a large data center far away from the field where the IIoT devices are deployed. After the data is processed, value added data (such as predictions from model simulations described in FIG. 2) and/or further instructions are sent back to the IIoT devices. This two-layer architecture (consisting of a central network and the IIot devices) may be inefficient for certain field operations that rely on real-time data processing and analysis. For example, it may take time for large data set to travel from remote field back to the central network for processing especially if the site of operation is in a location with relatively low bandwidth connections out of the site. Additionally, the data traveling back and forth between the field and the central network may create intensive strain on network bandwidth especially for low bandwidth connections. A combined effect due to long distance and exchanges of large amounts of volume data may unsatisfactorily increase network latency that may inhibit the field operations.

Edge computing may provide a method to reduce network latency and bandwidth issues by performing basic/preliminary data processing and analysis at the edge of the central network, near the source of the field data. By shifting at least a portion of computing power closer to the data origin, the latency or communication bandwidth issue may be eliminated or reduced. For example, when the IIoT devices have insufficient connectivity to be seamlessly communicated with the central network, the edge computing may provide real-time data processing to avoid latency issues between networks (e.g., via the Internet) that may affect the performance of the IIoT devices.

Figure 6:
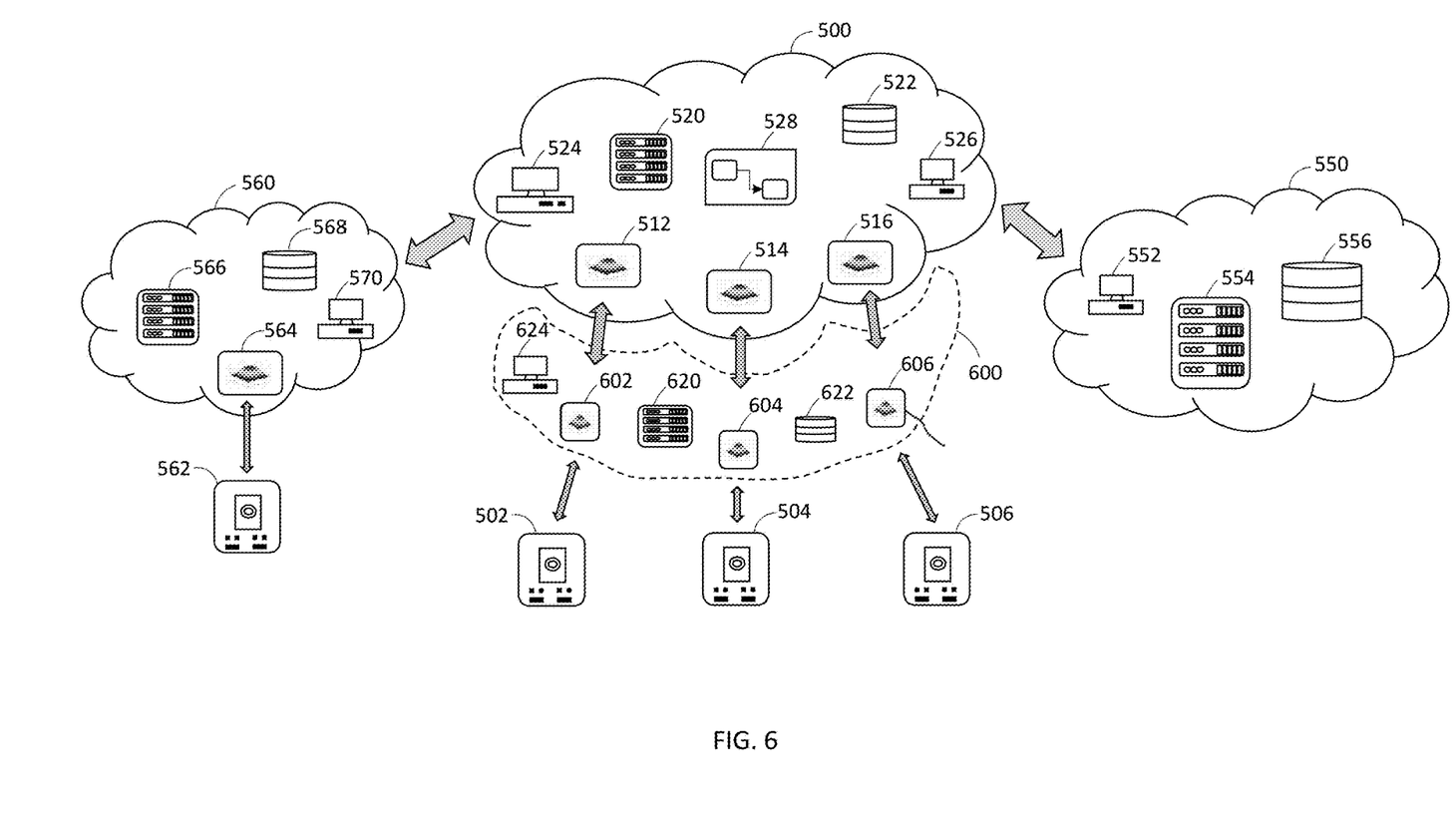
FIG. 6 depicts a schematic diagram of an implementation of digital avatars as an edge avatar and a cloud avatar, in accordance with an embodiment.

FIG. 6 depicts a schematic diagram of digital avatars used to implement corresponding edge avatars and cloud avatars. The cloud 500 interacts with the separate cloud 560 and the public cloud 550, which is similar to the cloud avatar implementation illustrated in FIG. 5 and generally functions as discussed above. However, FIG. 6 illustrates an edge processing portion 600 located at or near an edge of a site between the field assets 502, 504, and 506 and the cloud 500. The edge processing portion 600 maintains multiple edge avatars 602, 604, and 606 that are each tied to respective field assets 502, 504, and 506. In some embodiments, the field assets 502, 504, and 506 may be indirectly linked to the cloud 500 via the respective edge avatars 602, 604, and 606. Using the edge avatars 602, 604, and 606, the edge processing portion 600 handles leveraging data from the field assets 502, 504, and 506 to reduce response time without inhibiting operational efficiency using the field assets 502, 504, and 506. The edge avatars 602, 604, and 606 may perform edge calculations when connections to the cloud avatars 512, 514, and 516 in the cloud 500 are lost.

The edge processing portion 600 uses edge servers 620 and edge storage 622 to process and store field data generated by the field assets 502, 504, and 506 more quickly than may be obtainable using the cloud avatars 512, 514, and 516 thereby enabling more efficient real-time applications. The edge storage 622 may be similar to the cloud storages 522. A user interface 624 may be provided to enable users to gain access to the edge avatars 602, 604, and 606 and other edge-based services, such as field data visualization and quality control.

Each edge avatar 602, 604, or 606 includes a simulation model that is tailored to unique aspects of the respective field asset 502, 504, or 506 to which the edge avatar is assigned. The simulation model used by the edge avatars 602, 604, and 606 may be similar to the simulation models used by the corresponding cloud avatars 512, 514, and 516 to which the edge avatars 602, 604, and 606 are linked. For example, the simulation models used by the edge avatars 602, 604, and 606 and the cloud avatar may be created from the same/similar digital avatar template(s) corresponding to specific type of the field asset. The simulation model used by the edge avatar may be configured to perform rapid simulations based on real-time field data and short-term historical data stored in the local database(s) in the edge storage 622. As a comparison, the simulation model used by the cloud avatars 512, 514, and 516 may be configured to perform advanced simulations based on long-term historical data stored in the cloud storage 522. In some embodiments, the advanced simulations may use additional information from the other clouds (e.g., the separate cloud 560) to have better simulated results. For example, a first cloud avatar assigned to a first production well in a developing oil field may use operational data from a second cloud avatar assigned to a second production well in a developed oil field to run new simulations that may lead to better operational parameters for the first production well.

In one or more embodiments, the field assets 502, 504, 506, and 562 may represent a fleet of assets, such as two groups of electric submersible pumps (ESPs) deployed in two geographically separated oil fields. For example, the field assets 502, 504, and 506 may be part of a group of ESPs deployed in a first oil field in a first location (e.g., North American), and the field asset 562 is an ESP deployed in a second oil field in a second location (e.g., Asia). The ESP is a type of equipment that provides an efficient and reliable artificial-lift method for lifting moderate to high volumes of fluids from wellbores. These volumes may range from a low of 150 barrels per day (B/D) to as much as 150,000 B/D. Variable-speed controllers may extend this range significantly, both on the high and low side. In the first oil field, the edge avatars 602, 604, and 606 may utilize the real-time ESP data (such as wellhead pressure, torque, and discharge pressure) from the field assets 502, 504, and 506, combined with short term historical data (such as intake pressure and bottom hole temperature) stored in the edge storage 622 to execute rapid simulations to generate predictions related to short-term well operations below a threshold of time. The predictions may be used by variable-speed controllers of the ESPs to adjust the fluid volumes lifted from wellbores. The cloud avatars 512, 514, and 516 may use the real-time ESP data and short term data from the edge avatars 602, 604, and 606, combined with long term historical data stored in the cloud storage 522 and additional information (e.g., ESP design parameters from an ESP design module) to generate predictions related to long-term well operations over the threshold of time. For example, the long-term well operations may include maintaining stabilized productions longer than the threshold. In addition, by exchanging information between the cloud avatars 512, 514, and 516, long term oil field development may be planned by optimization of well pattern development in the first oil field.

Furthermore, the simulation data from the first oil field may be used by the second oil field that may have similar geological formations around production depths as the first oil field. The production wells in the second oil field may be newly developed and may operate inefficiently. Certain simulation parameters or results from at least one cloud avatar (602, 604, or 606) in the first oil field may be provided to the cloud avatar 564 that is assigned to the field asset 562 in the second oil field as additional input data to calibrate the simulation model used by the cloud avatar 564. The model calibration may enhance the operations of the field asset 562 in the second oil field.

Figure 7:
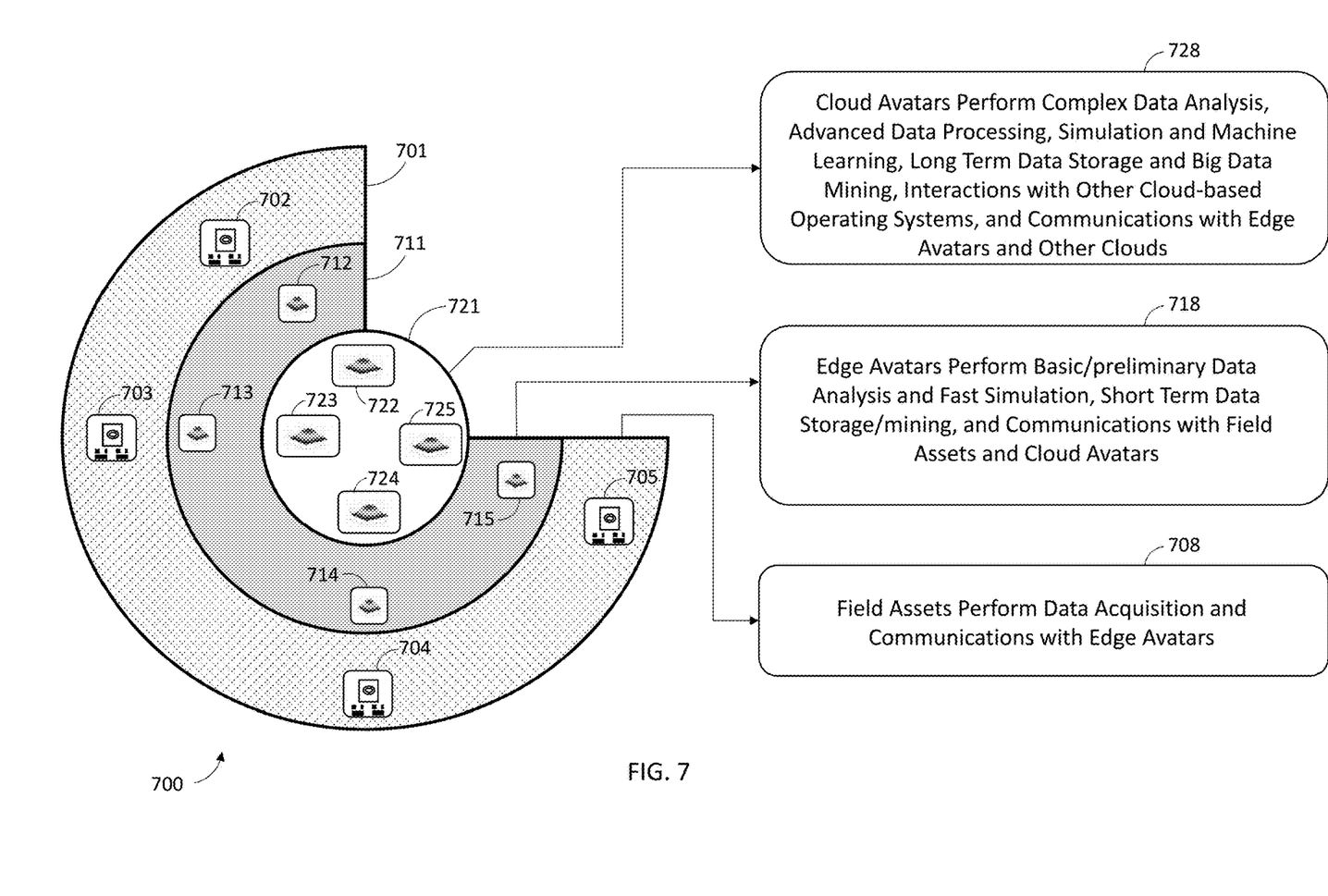
FIG. 7 depicts a schematic diagram of a three-layer architecture that may be used to implement the digital avatars of FIG. 6.

The digital avatars described in FIG. 6 may use a three-layer architecture 700 illustrated in a schematic diagram in FIG. 7. An outer layer 701 may include multiple field assets 702, 703, 704, and 705, which may represent physical devices, processes, or services, similar to or equivalent to the previously discussed item 110 and field assets 502, 504, 506, and 562. The outer layer 701 may represent an industrial field such as a manufacturing center, a chemical plant, or a remote oil field, where the field assets 702, 703, 704, and 705 are physically deployed.

A middle layer 711 may include multiple edge avatars 712, 713, 714, and 715, which are assigned to respective field assets 702, 703, 704, and 705 similar to the edge avatars 602, 604, and 606. The middle layer 711 may represent the edge processing portion 600 that is close to the industrial field.

An inner layer 721 may include multiple cloud avatars 722, 723, 724, and 725 linked to the corresponding edge avatars 712, 713, 714, and 715. The inner layer 721 may represent a central network or a cloud (e.g., the cloud 500) located away from the industrial field.

The field assets 702, 703, 704, and 705 in the outer layer 701 perform data acquisition in field operations and communications with the edge avatars (block 708) in the middle layer 711. At least a portion of the field assets 702, 703, 704, and 705 may have limited connectivity or bandwidth in communication with the inner layer 721

The middle layer 711 may provide real-time data processing at the edge of the outer layer 701 by moving computing power closer to the data origins. The block 718 outlines the features of the edge avatars 712, 713, 714, and 715. As noted, the edge avatars 712, 713, 714, and 715 may perform preliminary data analysis, such as data validation and basic data visualization. With short term data storage/mining provided by local storage (e.g., the edge storage 622), the edge avatars 712, 713, 714, and 715 may perform data pre-processing using short term data historical features. The pre-processing may include data tagging, cleansing, filtering, and aggregation. The edge avatars 712, 713, 714, and 715 may perform further model-based simulations based on the data acquired by field assets 702, 703, 704, and 705, and/or pre-processed data to create value added data. Additionally or alternatively, the edge avatars 712, 713, 714, and 715 may facilitate communications between the field assets 702, 703, 704, and 705 and the linked cloud avatars 722, 723, 724, and 725. The communications may include providing value added data/learnings to the cloud avatars 722, 723, 724, and 725 to provide instructions to the field assets 702, 703, 704, and 705 and to provide device-to-device communications between the field assets 702, 703, 704, and 705 and the cloud avatars 722, 723, 724, and 725.

The inner layer 721 may provide comprehensive data processing in the cloud 500 with advanced computational power and data storage. The block 728 outlines the features of the cloud avatars 722, 723, 724, and 725. The cloud avatars 722, 723, 724, and 725 may perform complex data analysis, such as higher-level data validations (e.g., based on a domain type of the data) and advanced visualization (e.g., field asset performance profile over a long time period). With long-term data storage and data mining provided by cloud storage (e.g., the cloud storage 522), the cloud avatars 722, 723, 724, and 725 may use the value added data/learnings from the edge avatars 712, 713, 714, and 715 to perform advanced data processing, simulation, and machine learning. The cloud avatars 722, 723, 724, and 725 may also perform interactions with other cloud-based operational systems (e.g., the operational systems 528). Additionally, the cloud avatars 722, 723, 724, and 725 may perform communications with other private or public clouds. In some embodiments, the work using the digital avatar 140 may be implemented using either the cloud avatars 722, 723, 724, and 725 and/or the corresponding edge avatars 712, 713,

714, and 715 with the performing avatar selected based on available processing and/or a priority timeliness setting.

Figure 8:
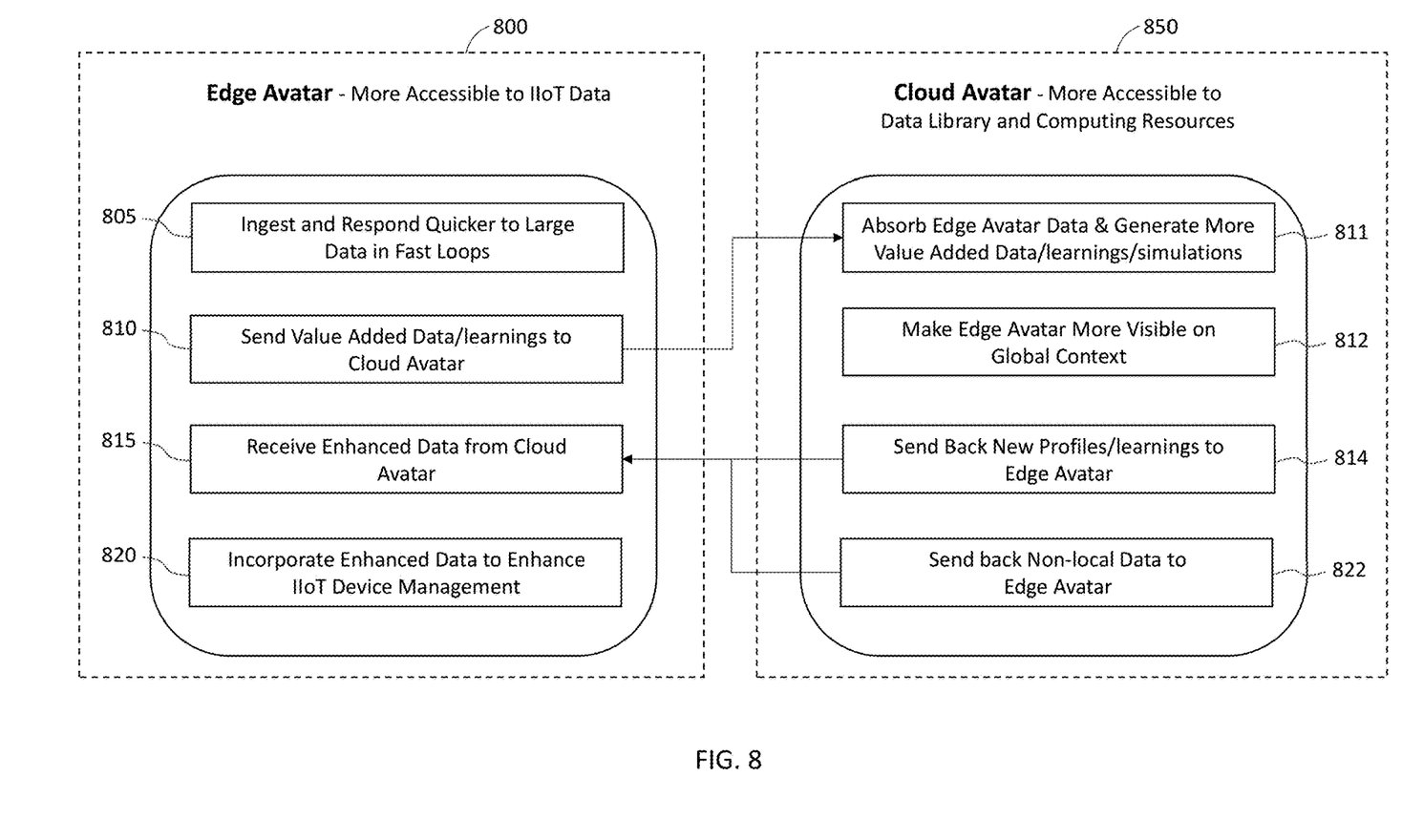
FIG. 8 illustrates functionalities of the digital avatars and relations between the digital avatars, in accordance with an embodiment.

FIG. 8 illustrates functionalities of the digital avatars and relations between the digital avatars. An edge avatar 800 may be more accessible to IIoT data generated by IIoT devices, such as the field assets 502, 504, and 506 of FIG. 5. The edge avatar 800 may ingest and respond quicker to large data in fast loops (block 805). For example, the real time streaming data captured by IIoT devices may be used to optimize production and prevent a product or tool from defects or failure.

The edge avatar 800 may also send value added data or learnings to a cloud avatar 850 (block 810). The value added data or leanings may be analyzed, pre-processed, and/or used to model simulated data using IIoT data as input. For example, the edge avatar 800 may receive data from a sensor, run simulation using a Finite Element (FE) model, a Finite Difference Model (FDM), or other algorithms, and provide output to the cloud avatar 850.

The cloud avatar 850 may have more computing resources and may be used to provide enhanced data with more thorough analysis than possible through the edge avatar 800. The cloud avatar 850 may absorb edge avatar data and generate more value added data, learnings, or advanced simulations (block 811). The more value added data, learnings, or advanced simulations may be results from complex analytics, big data mining, advanced data processing, machine learnings, interactions with other cloud-based operational systems, and communications with other private or public clouds that are less feasible using the edge avatar 800.

As part of being more accessible to data libraries and computing resources, the cloud avatar 850 may also make the edge avatar 800 more visible in a global context (block 812). For example, the edge avatar 800 may be viewed through the cloud 500 via the respective cloud avatar 850. Remote users may select, monitor, track and configure the edge avatar 800 via the cloud avatar 850. The remote users may also view any dependencies between the edge avatar 800 and other edge avatar(s). For example, by searching the cloud-based global databases, another cloud avatar may be identified (e.g., using data domain type) to have the same type of IIoT device to which the edge avatar 800 is assigned.

After more complex data analysis, advanced data processing, and/or machine learning, the cloud avatar 850 may send back new profiles/learnings to edge avatar 800 as enhanced data (block 814). The edge avatar 800 may receive enhanced data from the cloud avatar 850 (block 815). For example, the enhanced data may include more fine-tuned model calibration parameters from another cloud avatar, which is assigned to an IIoT device that has the same model number as the IIoT device to which the edge avatar 800 is assigned.

Additionally, the edge avatar 800 may further incorporate the enhanced data to enhance IIoT devices management (block 820). For instance, through the edge avatar 800 the IIoT devices may update its models based at least in part on data generated by the cloud avatar 850 and manage the field devices in a corresponding manner.

As previously noted, the cloud avatar 850 may be accessible to more operational systems, designs, global data storage and library, other digital avatars, and more computing resources. For example, the cloud avatar 850 may interact with other cloud-based operational systems and cloud avatars. In one or more embodiments, a cloud data storage may include a Distributed Database Management System (DDMS), which may be used as a centralized application to manage the data organized in a distributed manner. The DDMS may synchronize the data periodically and ensure any change in the data (e.g., updated data from the IIoT devices) is universally updated in a cloud-based global databases. In one or more embodiments, simulations models used by the cloud avatar 850 and edge avatar 800 may be selected from a model template library so that the modeling scientists may create replicable implementation models with minimum programming effort.

In some embodiments, after interacting with other systems or clouds, the cloud avatar 850 may send back non-local data to edge avatar 800 (block 822). For example, the cloud avatar 850 may send data from other edge avatars that are in similar conditions, environments, or functions as the edge avatar 800. In one or more embodiments, a user may check the region where a new edge avatar is going to be deployed, and browse the corresponding avatar inventory associated with the specific region and search for other avatars deployed in the same region. These avatars may have data or metadata that can be used to preconfigure or set a condition for the new edge avatar.

In other words, the edge avatar 800 may be an integral part of cloud-based service infrastructure without replacing the robust abilities of the cloud avatar 850. The implementations of cloud avatar 850 may be associated with more significant computational power, but the resulting data accumulation and processing may not be quick enough for certain operations that rely on applying the computational results more rapidly. The cloud avatar 850 may use the massive data storage and global data resources for data processing to find optimization solutions for making operational decisions that may not be available from the edge avatar 800 due to the limited computing resource at edge. Using these resources, the cloud avatar 850 may be used to update and/or refine the edge avatar 800 based on more robust computations and/or inputs from other avatars/interfaces as a way to provide access to the edge avatar 800 via the cloud avatar 850.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for use with a particular physical device or process located at an industrial site, the system comprising:
   an edge processing part comprising a processor and configured to implement an edge avatar for the particular physical device or process, wherein the edge avatar includes a first simulation model that simulates operation of the particular physical device or process to provide a unique representation of the particular physical device or process over time; and a cloud processing part comprising a processor and operably coupled to the edge processing part, wherein the cloud processing part is implemented in a cloud network remote from the industrial site, wherein the cloud processing part is configured to implement a cloud avatar for the particular physical device or process, wherein the cloud avatar is linked to the edge avatar, and wherein the cloud avatar includes a second simulation model that simulates operation of the particular physical device or process to provide another unique representation of the particular physical device or process over time;

wherein the edge avatar is configured to:
receive data generated by the particular physical device or process located at the industrial site;
use the received data generated by the particular device or process as input to the first simulation model to simulate operation of the particular physical device or process and obtain specific parameters related to operation of the particular physical device or process;
send information related to the specific parameters obtained from the simulation performed by the first simulation model of the edge avatar to the cloud avatar;
receive data from the cloud avatar; and
use the received data from the cloud avatar to update the first simulation model of the edge avatar.

2. The system of claim 1, wherein the specific parameters comprise a heat generation profile for the particular device or process, a maximum operating temperature for the particular physical device or process, a maximum operating pressure for the particular physical device or process, an operation limit for a particular physical device or process, the like, or combinations thereof.

3. The system of claim 1, wherein the edge avatar for the particular physical device is different from an edge avatar for another physical device having a same part number as the particular physical device.

4. The system of claim 1, wherein the edge avatar provides quicker results than available through the cloud avatar.

5. The system of claim 4, wherein the edge avatar provides quicker results than the cloud avatar due to latency between the industrial site and the cloud processing part.

6. The system of claim 1, wherein the cloud avatar utilizes more computational power than the edge avatar.

7. The system of claim 1, wherein the cloud avatar provides a link to the edge avatar to enable users to view or interact with the edge avatar.

8. The system of claim 1, wherein the data from the cloud avatar comprises a newly generated profile for the particular physical device or process generated using the cloud avatar.

9. The system of claim 1, wherein the data from the cloud avatar comprises non-local data pertaining to parameters at other locations other than the industrial site.

10. The system of claim 1, wherein the received data generated by the particular physical device or process comprises real-time data captured at the industrial site.

11. The system of claim 1, wherein the first simulation model comprises a finite element model or a finite difference model for the particular physical device or process.

12. The system of claim 1, wherein the information related to the specific parameters comprises an output of the first simulation model.

13. The system of claim 1, wherein the edge avatar is configured to perform edge calculations when a connection to the cloud network is lost.

14. The system of claim 1, wherein the edge processing part is operably coupled between the industrial site and the cloud network.

15. A system for use with a particular physical device or process located at an industrial site, the system comprising:
an edge processing part comprising a processor and configured to implement an edge avatar for the particular physical device or process, wherein the edge avatar includes a first simulation model that simulates operation of the particular physical device or process to provide a unique representation of the particular physical device or process over time; and
a cloud processing part comprising a processor and operably coupled to the edge processing part, wherein the cloud processing part is implemented in a cloud network remote from the industrial site, wherein the cloud processing part is configured to implement a cloud avatar for the particular physical device or process, wherein the cloud avatar is linked to the edge avatar, and wherein the cloud avatar includes a second simulation model that simulates operation of the particular physical device or process to provide another unique representation of the particular physical device or process over time;
wherein the cloud avatar is configured to:
receive outputs of the first simulation model of the edge avatar;
use the received outputs as input to the second simulation model to simulate operation of the particular physical device or process; and
send data to the edge avatar for updating the first simulation model of the edge avatar.

16. The system of claim 15, wherein the second simulation model employs contextual data supplied from other avatars.

17. The system of claim 16, wherein the data sent to the edge avatar is based at least in part on the other avatars.

18. The system of claim 15, wherein the cloud processing part has more computing resources than the edge processing part.

19. A method for use with a particular physical device or process located at an industrial site, the method comprising:
generating an edge avatar based at least in part on properties of the particular physical device or process, wherein the edge avatar includes a first simulation model that simulates operation of the particular physical device or process to provide a unique representation of the particular physical device or process over time;
storing the edge avatar as part of an edge processing part operably coupled to a cloud processing part, wherein the cloud processing part is implemented in a cloud network remote from the industrial site, wherein the cloud processing part is configured to implement a cloud avatar for the particular physical device or process, and wherein the cloud avatar includes a second simulation model that simulates operation of the particular physical device or process to provide another unique representation of the particular physical device or process over time;
linking the edge avatar to the cloud avatar;

receiving, at the edge avatar, data generated by the particular physical device or process located at the industrial site;

outputting outputs from the first simulation model of the edge avatar to the cloud avatar;

receiving, at the edge avatar, data from the cloud avatar; and using the data received from the cloud avatar to update the first simulation model of the edge avatar.

20. The method of claim 19, wherein the cloud avatar makes the edge avatar visible to a user interface via the cloud network.

21. The method of claim 19, wherein:

the first simulation model of the edge avatar performs simulations of the operations of the particular physical device or process based on real-time field data and short-term historical data stored by storage of the edge processing part; and the second simulation model of the cloud avatar performs simulations of the operations of the particular physical device or process based on at least one of: real-time field data, long-term historical data stored by storage of the cloud processing part, short-term data supplied by one or more edge avatars, information from at least one other cloud avatar, and additional information.

* * * * *